(12) United States Patent
Lin et al.

(10) Patent No.: US 12,232,646 B2
(45) Date of Patent: Feb. 25, 2025

(54) POT COVER AND COOKWARE

(71) Applicant: JIANGMEN BONANZA METALWARE CO., LTD., Jiangmen (CN)

(72) Inventors: Yaohuan Lin, Jiangmen (CN); Qiang Hu, Jiangmen (CN)

(73) Assignee: JIANGMEN BONANZA METALWARE CO., LTD., Jiangmen (CN)

( * ) Notice: Subject to any disclaimer, the term of this patent is extended or adjusted under 35 U.S.C. 154(b) by 253 days.

(21) Appl. No.: 17/419,592

(22) PCT Filed: Jan. 11, 2019

(86) PCT No.: PCT/CN2019/071261
§ 371 (c)(1),
(2) Date: Jun. 29, 2021

(87) PCT Pub. No.: WO2020/140304
PCT Pub. Date: Jul. 9, 2020

(65) Prior Publication Data
US 2022/0087471 A1 Mar. 24, 2022

(30) Foreign Application Priority Data

Jan. 4, 2019 (CN) .......................... 201910008495.5

(51) Int. Cl.
*A47J 36/12* (2006.01)
*A47J 27/00* (2006.01)
*A47J 45/06* (2006.01)

(52) U.S. Cl.
CPC ............. *A47J 36/12* (2013.01); *A47J 27/002* (2013.01); *A47J 45/06* (2013.01)

(58) Field of Classification Search
CPC ........... A47J 36/12; A47J 27/002; A47J 45/06
(Continued)

(56) References Cited

U.S. PATENT DOCUMENTS 1,390,766 A * 9/1921 Cunningham .......... A47J 36/12
220/744
2,259,770 A * 10/1941 Nove ...................... A47J 36/12
220/379

(Continued)

FOREIGN PATENT DOCUMENTS

| CN | 85109657 A | 10/1987 |
| CN | 2732150 Y | 10/2005 |

(Continued)

OTHER PUBLICATIONS

European Patent Office, Supplementary European Search Report dated Dec. 22, 2021 in European Patent Application No. 19907390, 2 pages.

(Continued)

*Primary Examiner* — Don M Anderson
*Assistant Examiner* — Elizabeth J Volz
(74) *Attorney, Agent, or Firm* — Inskeep IP Group, Inc.

(57) ABSTRACT

A pot cover and a cookware are disclosed. The pot cover may include: a cover body (100); a handle (200) arranged on the cover body (100), where the handle (200) may include: a connecting part (210) configured to connect the cover body (100); and a holding part (220) configured to facilitate holding, where an end of the holding part (220) is provided with a groove (300) for insertion. The cookware may include: a pot body; and the pot cover, where the groove (300) can insert at any position of an opening edge of the pot body.

8 Claims, 5 Drawing Sheets

(58) Field of Classification Search
USPC .................................. 220/573.1, 768, 759
See application file for complete search history.

(56) References Cited

U.S. PATENT DOCUMENTS

| | | |
|---|---|---|
| 4,005,798 A | 2/1977 | Minsky |
| 9,125,514 B1 | 9/2015 | Rohrer |
| 2011/0095031 A1 | 4/2011 | Welk et al. |

FOREIGN PATENT DOCUMENTS

| | | | | |
|---|---|---|---|---|
| CN | 102920363 | * | 2/2013 | .............. A47J 45/06 |
| CN | 102920363 A | | 2/2013 | |
| CN | 202950543 U | | 5/2013 | |
| CN | 105266601 A | | 1/2016 | |
| CN | 207370632 U | | 5/2018 | |
| CN | 305207843 S | | 6/2019 | |

OTHER PUBLICATIONS

European Patent Office, European Search Opinion dated Jan. 11, 2022 in European Patent Application No. 19907390, 3 pages.
Federal Institute of Industrial Property, Office Action issued Oct. 1, 2021 in Japanese Patent Application No. 2021119222/03(040445) filed Jan. 11, 2019 (with English translation), 10 pages.

* cited by examiner

POT COVER AND COOKWARE

RELATED APPLICATIONS

This application is a national stage filing under 35 U.S.C. § 371 of international application number PCT/CN2019/071261, filed Jan. 11, 2019, which claims priority to Chinese patent application No. 201910008495.5, filed Jan. 4, 2019, both of which are incorporated herein by reference in their entireties.

TECHNICAL FIELD

The present disclosure relates to the technical field of kitchen utensils, in particular to a pot cover and a cookware.

BACKGROUND

A pot cover is a common kitchen appliance, which is mainly used to maintain the temperature of the contents in the pot, and can be used to prevent liquid splashing and steam escaping caused by heating of the contents in the pot. In daily use, when the pot cover covers the pot body to cook food, liquid mixed with food residues will condense on the inner wall of the pot cover. When the pot cover needs to be opened to take out the food in the pot, the pot cover often needs to be placed on the table top, which not only occupies space, but also makes the liquid mixed with food residues easily drip on the table top, thus soiling the table top and increasing the cleaning labor.

SUMMARY

The present invention provides a pot cover and a cookware, which can not only reduce the space occupation rate of the kitchen table top, but also prevent the liquid mixed with food residues from dripping on the table top, and are more convenient, simple and tidy to use.

The technical schemes adopted by the present disclosure are as follows.

In a first aspect, an embodiment of the present disclosure provides a pot cover, comprising: a cover body; a handle arranged on the cover body, wherein the handle comprises: a connecting part configured to connect the cover body; and a holding part configured to facilitate holding, wherein an end of the holding part is provided with a groove for insertion.

In some embodiments, a projection of the groove on a horizontal plane is in a projection of the cover on the horizontal plane.

In some embodiments, the depth of the groove ranges from 2 mm to 50 mm.

In some embodiments, the width of the groove ranges from 2 mm to 50 mm.

In some embodiments, a first groove surface, a second groove surface and a third groove surface are formed at the end of the holding part, the first groove surface and the third groove surface are oppositely arranged and respectively connected with the second groove surface, and the third groove surface is convex toward the first groove surface and arranged in an arc shape.

In a second aspect, an embodiment of the present disclosure provides a cookware comprising: a pot body; and a pot cover as described above, wherein the groove is capable of inserting at any position of an opening edge of the pot body.

In some embodiments, when the groove is inserted at the opening edge of the pot body, the cover body abuts against the pot body so that the cover body forms an acute angle with the horizontal plane.

In some embodiments, when the groove is inserted at the opening edge of the pot body, a projection of a centroid of the pot cover on the horizontal plane is in the projection of the pot body on the horizontal plane.

In some embodiments, the opening edge of the pot body is provided with an outer flange, and a wall of the pot body is connected with the outer flange through an arc-shaped connecting edge.

In some embodiments, when the groove is inserted at the opening edge of the pot body, the arc-shaped connecting edge, the outer flange and an outer wall of the pot body are respectively in contact with an inner wall of the groove.

One or more technical schemes provided in several embodiments of the present disclosure have at least the following beneficial effects. After the pot cover is uncovered from the pot body, the groove is aligned with the opening edge of the pot body and the holding part is inserted at the opening edge of the pot body. At this time, the cover body can be supported above the opening of the pot body, thereby reducing the space occupation of the table top by the pot cover. As the cover body is supported above the opening of the pot body, the liquid mixed with food residues can flow back to the inside of the pot body along the cover body, thereby effectively preventing the liquid mixed with food residues from dripping on the table top. In addition, because the groove can be inserted at any position of the opening edge of the pot body, it is convenient for the user to use, so that the user does not need to deliberately find a place for placing the pot cover, and the use convenience is greatly improved. In addition, because the pot cover can be inserted at the opening edge of the pot body, even if the user moves the pot body, the problem of the pot cover falling will not occur, thus avoiding the problem of the pot cover falling and breaking caused by moving the pot body.

BRIEF DESCRIPTION OF THE DRAWINGS

The present disclosure will be further explained with reference to the accompanying drawings and examples.

DETAILED DESCRIPTION

In order to make the object, technical scheme and advantages of the present disclosure clear, the present disclosure will be further described in detail with reference to the drawings and examples. It should be understood that the specific embodiments described herein are only used to explain the present disclosure, and are not used to limit the present disclosure. It should be noted that, if there is no conflict, the various features in the embodiments of the present disclosure can be combined with each other, which are within the protection scope of the present disclosure.

According to the inventor's knowledge, in daily use, when the pot cover covers the pot body to cook food, liquid mixed with food residues will condense on the inner wall of the pot cover. When the pot cover needs to be opened to take out the food in the pot, the pot cover often needs to be placed on the table top, which not only occupies space, but also makes the liquid mixed with food residues easily drip on the table top, thus soiling the table top and increasing the cleaning labor.

Based on this, the present disclosure provides a pot cover and a cookware. By arranging a groove for insertion at the end of the holding part, the pot cover can be inserted at any position of the opening edge of the pot body and supported above the opening of the pot body, thereby reducing the space occupancy rate on the table top, preventing liquid mixed with food residues from dripping on the table top, and being more convenient, simple and tidy to use.

The embodiments of the present disclosure will be further explained with reference to the accompanying drawings.

Figure 1:
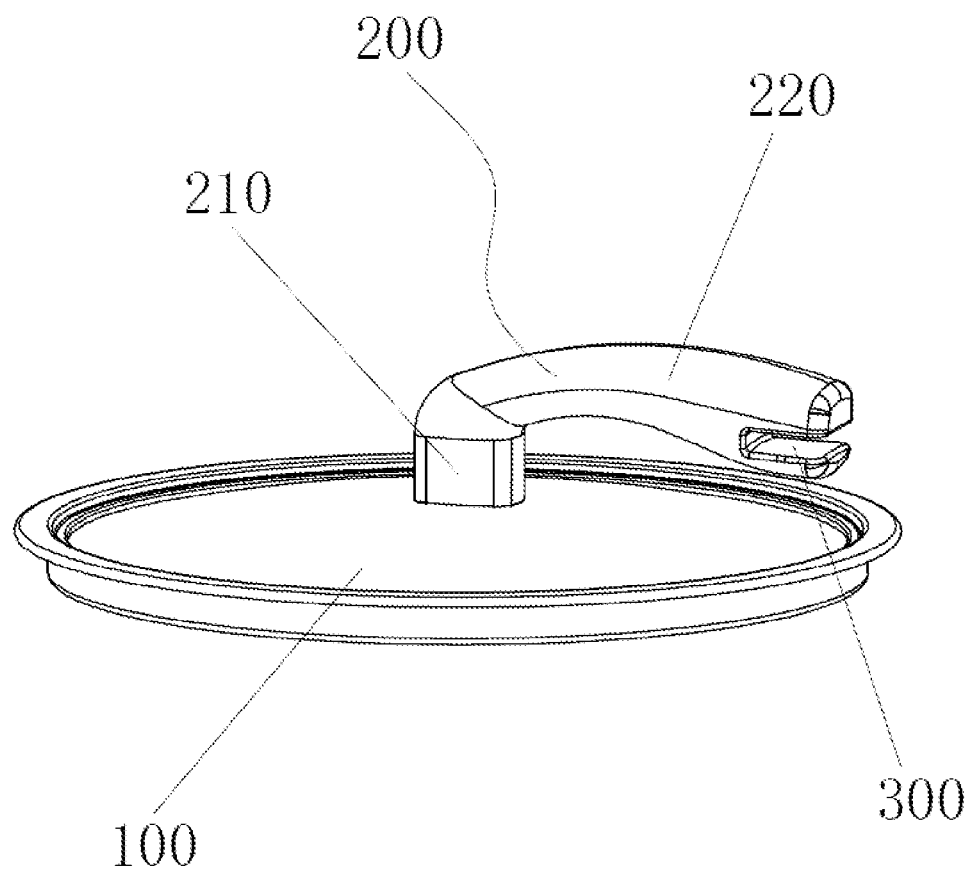
FIG. 1 is a schematic diagram of a pot cover according to an embodiment of the present disclosure.

Referring to FIG. 1, an embodiment of the present disclosure provides a pot cover, which comprises a cover body 100 and a handle 200 arranged on the cover body 100, wherein the handle 200 comprises a connecting part 210 for connecting the cover body 100 and a holding part 220 which is convenient to hold, and a groove 300 for inserting is arranged at an end of the holding part 220.

In this embodiment, the connection between the connecting part 210 and the cover 100 can be implemented in various ways. For example, the connecting part 210 and the cover 100 may be integrally formed. For another example, the connecting part 210 can be screwed and connected with the cover 100 by screws or bolts. For yet another example, the connecting part 210 can also be connected with the cover body 100 by buckling or snap-connected. In addition, the connecting part 210 and the holding part 220 can be connected in various ways. For example, the connecting part 210 and the holding part 220 may be integrally formed. For another example, the connecting part 210 and the holding part 220 can be screwed and connected. For yet another example, the connecting part 210 and the holding part 220 can also be snap-connected or connected by buckling.

In this embodiment, a groove 300 for insertion is provided at the end of the holding part 220. When the pot cover is uncovered from the pot body, the groove 300 is aligned with the opening edge of the pot body and the holding part 220 is inserted at the opening edge of the pot body. At this time, the cover body 100 can be supported above the opening of the pot body, thereby reducing the space occupied by the pot cover on the table top. Since the cover body 100 is supported above the opening of the pot body, the liquid mixed with food residues can flow back to the inside of the pot body along the cover body 100, thereby effectively preventing the liquid mixed with food residues from dripping on the table top, and being more convenient, simple and tidy to use. In addition, because the groove 300 can be inserted at any position of the opening edge of the pot body, it is convenient for the user to use, so that the user does not need to deliberately find a place to place the pot cover, and the convenience of use is greatly improved. In addition, because the pot cover can be inserted at the opening edge of the pot body, even if the user moves the pot body, the problem of the pot cover falling will not occur, thus avoiding the problem of the pot cover falling and breaking caused by moving the pot body.

Furthermore, based on the above embodiments, another embodiment of the present disclosure also provides a pot cover, wherein the projection of the groove 300 on the horizontal plane is in the projection of the cover 100 on the horizontal plane.

In this embodiment, the projection of the groove 300 on the horizontal plane is in the projection of the cover 100 on the horizontal plane. When the cover is viewed from top to bottom, the holding part 220 does not extend out of the cover body 100. Therefore, when the groove 300 provided at the end of the holding part 220 is inserted at the opening edge of the pot body, the cover body 100 extends into the pot body in an inclined manner, so the cover body 100 abuts against the opening edge of the pot body to form two connection points. When the groove 300 is inserted at the opening edge of the pot body, a third connection point will be formed. These three connection points are not on the same straight line, so these three connection points form a triangular support configuration with the characteristics of stability, firmness and pressure resistance. Therefore, even if the pot body is shaken, the pot cover can be stably fixed on the pot body, thereby avoiding the problem that the pot cover falls and breaks due to moving or shaking the pot body. In addition, since the cover body 100 extends into the pot body in an inclined manner, the liquid mixed with food residues can flow back into the pot body along the cover body 100, thereby effectively preventing the liquid mixed with food residues from dripping on the table top.

Furthermore, based on the above embodiments, another embodiment of the present disclosure also provides a pot cover, wherein the depth of the groove 300 ranges from 2 mm 50 mm.

In this embodiment, since the groove 300 needs to be inserted at the opening edge of the pot body, in order to ensure the connection stability between the pot cover and the pot body, the groove 300 needs to have a suitable depth. According to the inventor's research, because the pot cover has a certain weight, if the depth of the groove 300 is too small, the groove 300 can not stably support the pot cover, so it is easy for the pot cover to fall. After several tests by the inventor, when the depth of the groove 300 is not less than 2 mm, the opening edge of the pot can be inserted into the groove 300 and the groove 300 can be stably connected with the opening edge, thus ensuring the connection stability between the pot cover and the pot body. In addition, according to the inventor's research, since the cover body 100 extends into the pot body in an inclined manner and abuts against the opening edge, if the depth of the groove 300 is too large, the opening edge cannot be completely inserted into the groove 300, thus reducing the utilization degree of the groove 300. After several tests by the inventor, when the depth of the groove 300 is not more than 50 mm, the cover 100 can not only abut against the opening edge stably, but also the opening edge can be completely inserted into the groove 300, which improves the utilization degree of the groove 300 on the premise of ensuring the stable connection between the pot cover and the pot body.

Furthermore, based on the above embodiments, another embodiment of the present disclosure also provides a pot cover, wherein the width of the groove 300 ranges from 2 mm to 50 mm.

In this embodiment, since the groove 300 needs to be inserted at the opening edge of the pot body, and the opening edge is arranged in an arc shape, in order to ensure that the groove 300 can be inserted at the opening edge smoothly, the groove 300 needs to have a suitable width. According to the inventor's research, when the groove 300 is inserted at the edge of the opening, the groove 300 can support the pot cover. Since the pot cover has a certain weight, if the width of the groove 300 is too small, that is, if the strength of the groove 300 for supporting the pot cover is too small, the groove 300 is easily damaged, so that the groove 300 cannot be inserted by the opening edge. After several tests by the inventor, when the width of the groove 300 is not less than 2 mm, the groove 300 can have enough strength to support the weight of the pot cover, thus avoiding the damage of the groove 300. In addition, according to the inventor's research, because the opening edge is arranged in an arc shape, if the width of the groove 300 is too large, the groove 300 with too large width will not match the opening edge, thus affecting the effective insertion between the groove 300 and the opening edge. After several tests by the inventor, when the width of the groove 300 is not more than 50 mm, there will be no mismatch between the groove 300 and the opening edge of the pot body, thus ensuring the effective insertion between the groove 300 and the opening edge.

Figure 2:
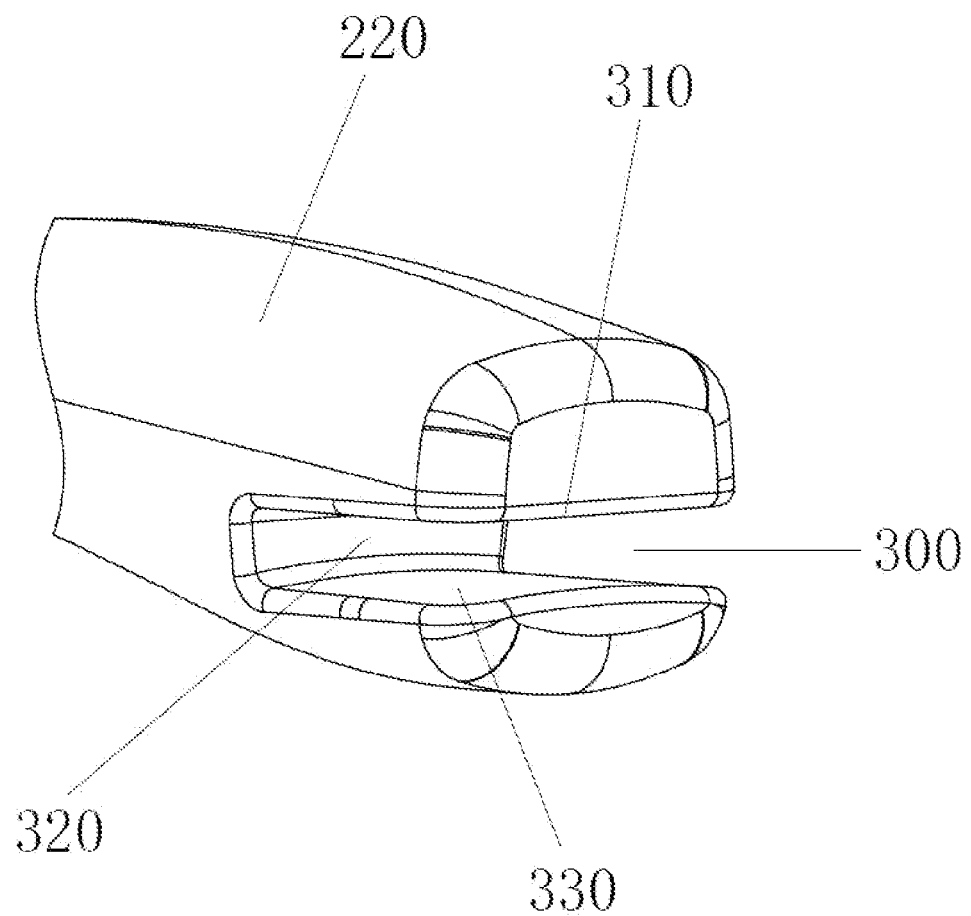
FIG. 2 is a schematic diagram of a groove in a pot cover according to another embodiment of the present disclosure.

Furthermore, based on the above embodiments, referring to FIG. 2, another embodiment of the present disclosure also provides a pot cover, in which a first groove surface 310, a second groove surface 320 and a third groove surface 330 are formed in the groove 300 at the end of the holding part 220. The first groove surface 310 and the third groove surface 330 are oppositely arranged and respectively connected with the second groove surface 320, and the third groove surface 330 is convex toward the first groove surface 310 and is arranged in an arc shape.

In this embodiment, when the groove 300 is inserted at the edge of the opening, the surface of the groove 300 near the inner wall of the pot body is the third groove surface 330, and the surface of the groove 300 near the outer wall of the pot body is the first groove surface 310. In this embodiment, the third groove surface 330 is convex toward the first groove surface 310 and arranged in an arc shape, and the arc curvature of the third groove surface 330 matches the arc curvature of the opening edge. Since the third groove surface 330 is matched with the opening edge, when the groove 300 is inserted at the opening edge, the third groove surface 330 can be attached to the opening edge, thereby increasing the contact area between the groove 300 and the opening edge, ensuring the contact tightness between the groove 300 and the opening edge, and improving the insertion stability between the groove 300 and the opening edge. Even if the user moves or shakes the pot body, the groove 300 will not loose from the opening edge of the pot body, so that the problem that the pot cover falls off due to moving or shaking the pot body can be avoided.

Figure 3:
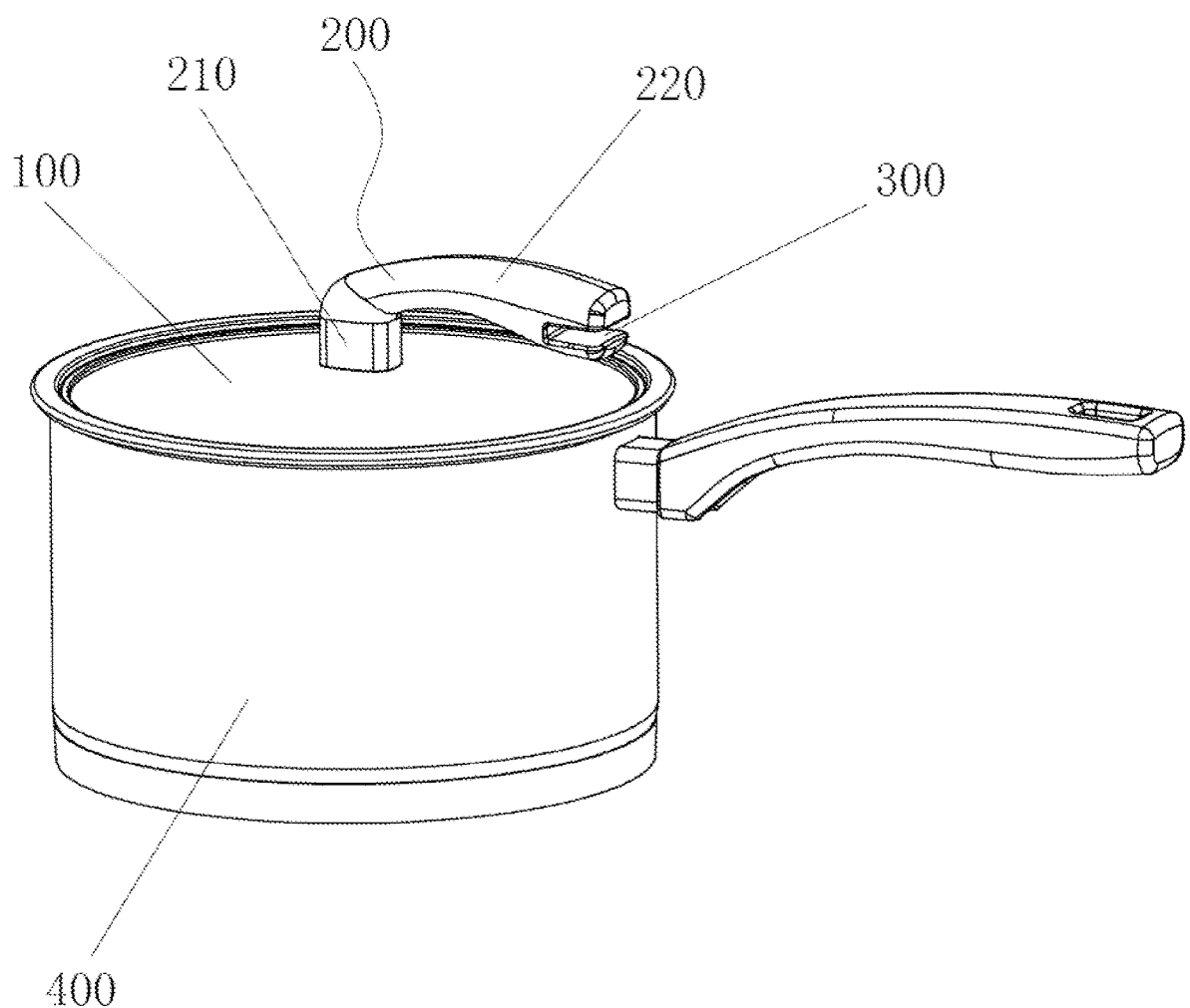
FIG. 3 is a schematic diagram of a cookware according to another embodiment of the present disclosure.
Figure 4:
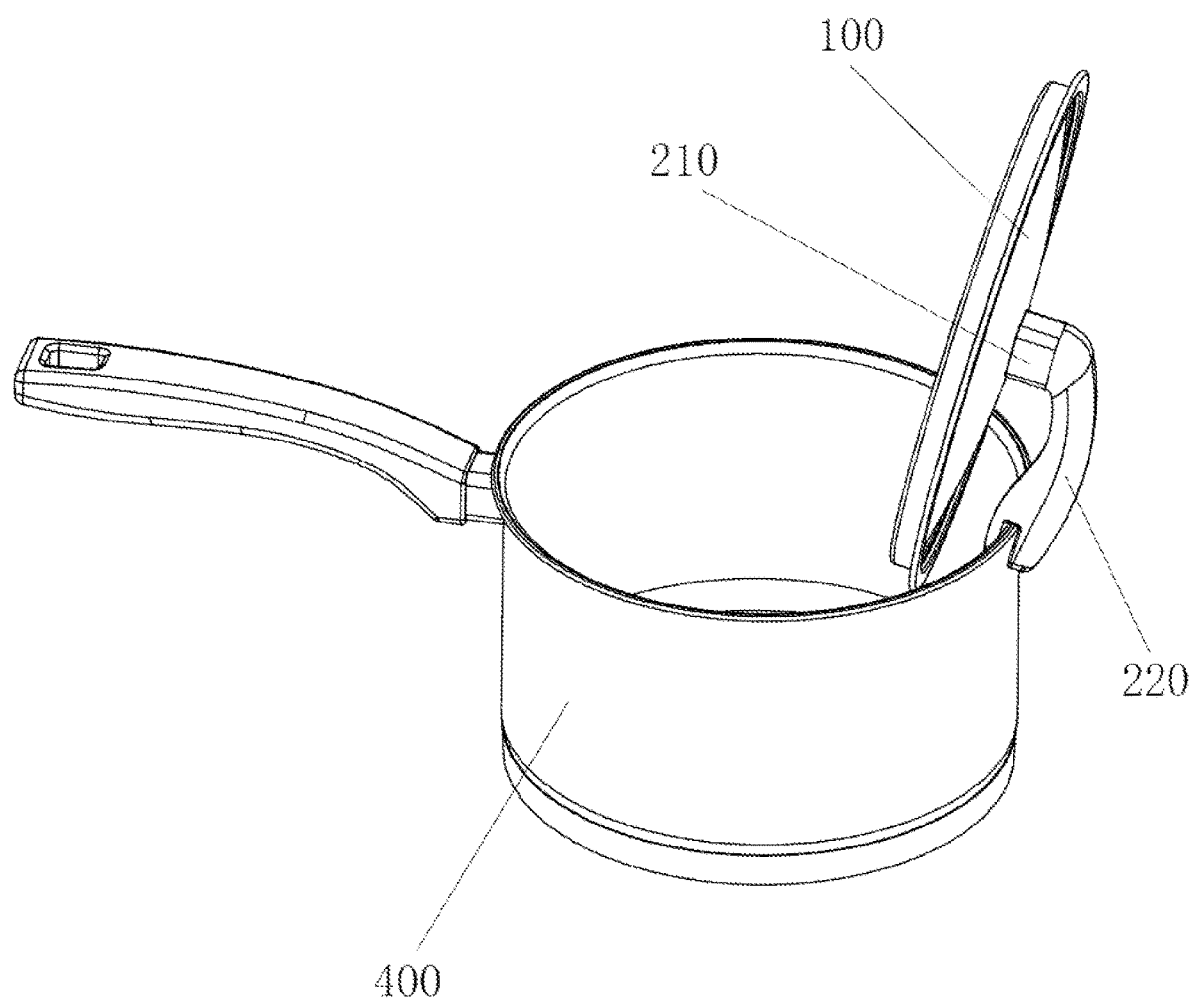
FIG. 4 is a schematic diagram of a pot cover inserted at a pot body according to another embodiment of the present disclosure.

Referring to FIG. 3 and FIG. 4, another embodiment of the present disclosure also provides a cookware, which comprises a pot body 400 and a pot cover in any of the above embodiments, and the groove 300 can be inserted at any position of the opening edge of the pot body 400.

In this embodiment, a groove 300 for insertion is provided at the end of the holding part 220 of the pot cover. When the pot cover is uncovered from the pot body 400, the groove 300 is aligned with the opening edge of the pot body 400 and the holding part 220 is inserted at the opening edge of the pot body 400. At this time, the cover body 100 can be supported above the opening of the pot body 400, thereby reducing the space occupied by the pot cover on the table top. Since the cover body 100 is supported above the opening of the pot body 400, the liquid mixed with food residues can flow back to the inside of the pot body 400 along the cover body 100, thereby effectively preventing the liquid mixed with food residues from dripping on the table top, and being more convenient, simple and tidy to use. In addition, because the groove 300 can be inserted at any position of the opening edge of the pot body 400, it is convenient for the user to use, so that the user does not need to deliberately find a place to place the pot cover, and the convenience of use is greatly improved. In addition, because the pot cover can be inserted at the opening edge of the pot body 400, even if the user moves the pot body 400, the problem of the pot cover falling will not occur, thus avoiding the problem of the pot cover falling and breaking caused by moving the pot body 400.

Figure 5:
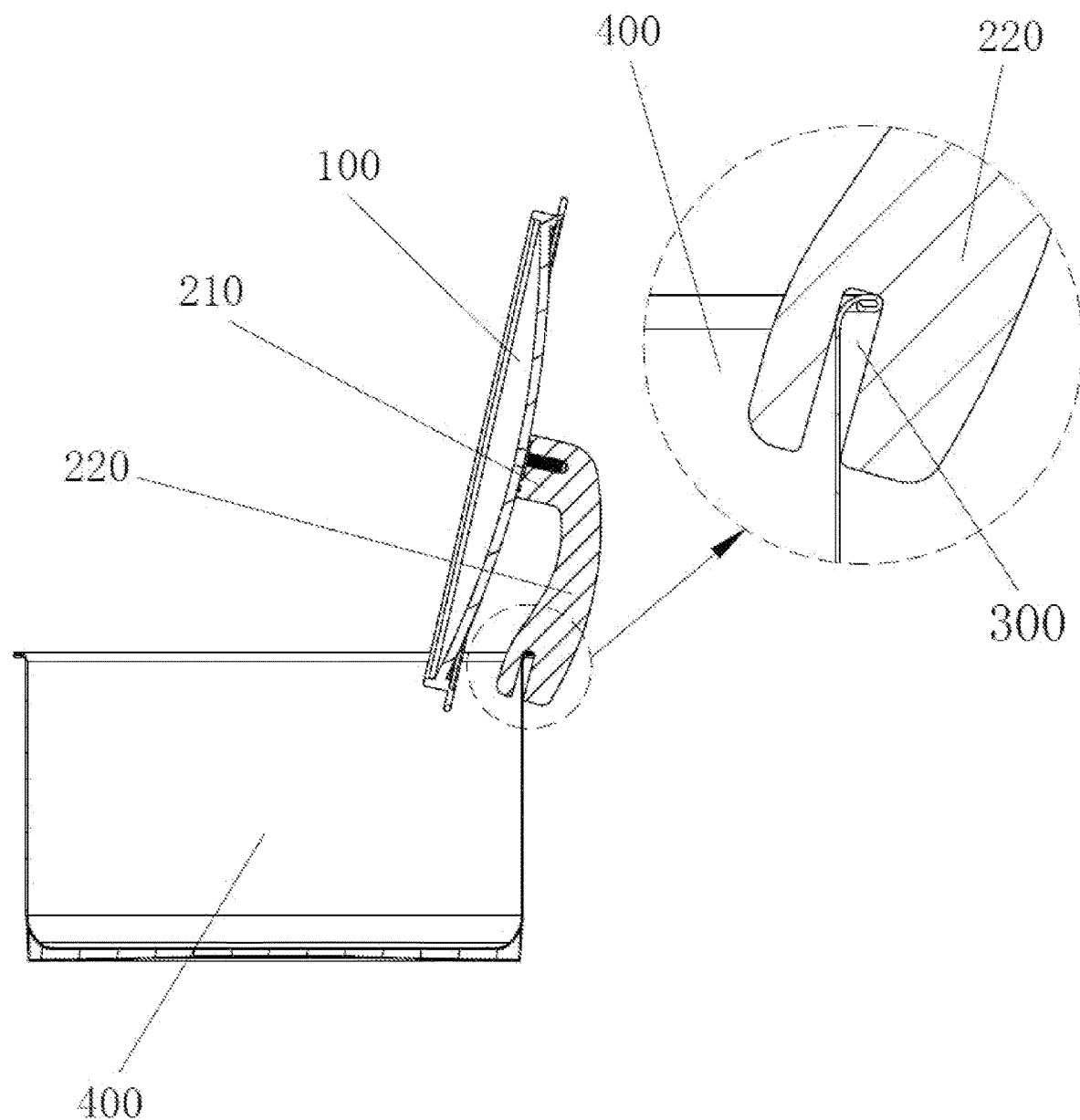
FIG. 5 is a sectional view of a pot cover provided by another embodiment of the present disclosure when inserted at a pot body.

Furthermore, based on the above embodiments, referring to FIG. 5, another embodiment of the present disclosure also provides a cookware, wherein when the groove 300 is inserted at the opening edge of the pot body 400, the cover body 100 abuts against the pot body 400 so that the cover body 100 forms an acute angle with the horizontal plane.

In this embodiment, when the groove 300 is inserted at the opening edge of the pot body 400, the cover body 100 abuts against the pot body 400, and the cover body 100 forms an acute angle with the horizontal plane, that is, the cover body 100 extends into the pot body 400 in an inclined manner. At this time, the cover body 100 abuts against the opening edge of the pot body 400 to form two connection points. In addition, the groove 300 forms a third connection point with the edge of the opening. Because these three connection points are not on the same straight line, these three connection points form stable, strong and pressure-resistant triangular support points. Therefore, even if the pot body 400 is shaken, the pot cover can be stably fixed on the pot body 400, so that the problem that the pot cover falls and breaks due to moving or shaking the pot body 400 can be avoided. In addition, since the cover body 100 extends into the pot body 400 in an inclined manner, the liquid mixed with food residues can flow back into the pot body 400 along the cover body 100, thereby effectively preventing the liquid mixed with food residues from dripping on the table top.

Furthermore, based on the above embodiments, another embodiment of the present disclosure also provides a cookware, wherein when the groove 300 is inserted at the opening edge of the pot body 400, the projection of the centroid of the pot cover on the horizontal plane is in the projection of the pot body 400 on the horizontal plane.

In this embodiment, when the groove 300 is inserted at the opening edge of the pot body 400, the pot cover is supported on the pot body 400 in an inclined manner. At this time, there are three connection points between the pot cover and the pot body 400, which form a triangular area. The projection of the center of mass of the pot cover on the horizontal plane lies in the projection of the pot body 400 on the horizontal plane, that is, the projection of the center of mass of the pot cover on the horizontal plane falls in the triangular area, and these three connection points form three stable support points. Under the weight of the pot cover, the pot cover can be stably supported on the pot body 400. Even if the user moves or shakes the pot body 400, the pot cover will not fall, thus avoiding the problem that the pot cover falls and breaks due to moving or shaking the pot body 400.

Furthermore, based on the above embodiments, referring to FIG. 5, another embodiment of the present disclosure also provides a cookware, in which the opening edge of the pot body 400 is provided with an outer flange, and the wall of the pot body 400 is connected with the outer flange through an arc-shaped connecting edge.

In this embodiment, the wall of the pot body 400 and the outer flange are connected by an arc-shaped connecting edge. When the pot cover is inserted at the opening edge of the pot body 400, the cover body 100 of the pot cover will contact with the arc-shaped connecting edge. At this time, the arc-shaped connecting edge can increase the contact area between the cover body 100 and the pot body 400, thereby improving the support stability between the cover and the pot body 400. When the pot body 400 is moved or shaken, the problem that the pot cover falls due to the large displacement of the pot cover can be avoided.

Furthermore, based on the above embodiments, referring to FIG. 5, another embodiment of the present disclosure also provides a cookware, wherein when the groove 300 is inserted at the opening edge of the pot body 400, the arc-shaped connecting edge, the outer flange and the outer wall of the pot body 400 respectively contact with the inner wall of the groove 300.

In this embodiment, the arc-shaped connecting edge, the outer flange and the outer wall of the pot body 400 are respectively in contact with the inner wall of the groove 300. Therefore, the groove 300 can be stably inserted at the opening edge of the pot body 400, so that the holding part 220 of the pot cover can be firmly inserted at the opening edge of the pot body 400, and the holding part 220 of the pot cover can stably support the pot cover without causing the pot cover to fall. Even if the user moves or shakes the pot body 400, the pot cover will not fall, so that the problem that the pot cover falls and breaks due to moving or shaking the pot body 400 can be avoided.

In addition, another embodiment of the present disclosure also provides a cookware, which comprises a pot cover and a pot body 400. The pot cover includes a cover body 100, a connecting part 210 for connecting the cover body 100, and a holding part 220 which is convenient to hold. The end of the holding part 220 is provided with a groove 300 for inserting the opening edge of the pot body 400. The projection of the groove 300 on the horizontal plane is in the projection of the cover 100 on the horizontal plane. A depth range and a width range of the groove 300 are 2 mm to 50 mm, respectively. A first groove surface 310, a second groove surface 320 and a third groove surface 330 are formed in the groove 300 at the end of the holding portion 220. The first groove surface 310 and the third groove surface 330 are oppositely arranged and respectively connected with the second groove surface 320. The third groove surface 330 protrudes toward the first groove surface 310 and is arranged as an arc surface. The opening edge of the pot body 400 is provided with an outer flange. The wall of the pot body 400 is connected with the outer flange through an arc-shaped connecting edge. When the groove 300 is inserted at the opening edge of the pot body 400, the cover body 100 abuts against the pot body 400 so that the cover body 100 forms an acute angle with the horizontal plane, and the projection of the centroid of the cover on the horizontal plane is in the projection of the pot body 400 on the horizontal plane. Furthermore, the arc-shaped connecting edge, the outer flange and the outer wall of the pot body 400 are respectively in contact with the inner wall of the groove 300.

In this embodiment, a groove 300 for inserting the pot body 400 is provided at the end of the holding part 220. After the pot cover is uncovered from the pot body 400, the groove 300 is aligned with the opening edge of the pot body 400 and the holding part 220 is inserted at the opening edge of the pot body 400. At this time, the cover body 100 can be supported above the opening of the pot body 400, so that the space occupied by the cover on the kitchen table can be reduced. Since the cover body 100 is supported above the opening of the pot body 400, the liquid mixed with food residues can flow back to the inside of the pot body 400 along the cover body 100, thereby effectively preventing the liquid mixed with food residues from dripping on the table top, and making use more convenient, simple and tidy. In addition, since the groove 300 can be inserted at any position of the opening edge of the pot body 400, it is convenient for the user to use, so that the user does not need to deliberately find a place to place the pot cover, and the convenience of use is greatly improved. In addition, when the cover is inserted at the opening edge of the pot body 400, the cover body 100 can abut against the pot body 400 so that the cover body 100 forms an acute angle with the horizontal plane, and the projection of the centroid of the cover on the horizontal plane is in the projection of the pot body 400 on the horizontal plane. In addition, the arc-shaped connecting edge, the outer flange and the outer wall of the pot body 400 are respectively contacted with the inner wall of the groove 300, so that even if the user moves or shakes the pot body 400, the pot cover will not fall, thus preventing the pot cover from falling and breaking due to moving or shaking the pot body 400.

Several implementations of the present disclosure have been specifically described above, but the present disclosure is not limited to the above implementations. Those skilled in the art can make various equivalent modifications or substitutions without departing from the essence of the present disclosure, and these equivalent modifications or substitutions are included in the scope defined by the appended claims.

The invention claimed is:

1. A pot cover, comprising:
 a cover body;
 a handle arranged on the cover body, wherein the handle comprises:
 a connecting part, positioned at a first end of the handle, and is configured to connect the cover body to the handle;
 a holding part configured to facilitate holding; and
 a groove for insertion positioned at a second end of the handle distal from the connecting part;
 wherein a depth of the groove ranges from 2 mm to 50 mm;
 wherein a first groove surface, a second groove surface and a third groove surface are formed at the end of the holding part, the first groove surface and the third groove surface are oppositely arranged and respectively connected with the second groove surface, and the third groove surface is convex toward the first groove surface and arranged in an arc shape.

2. The pot cover according to claim 1, wherein a projection of the groove on a horizontal plane is in a projection of the cover on the horizontal plane.

3. The pot cover according to claim 1, wherein a width of the groove ranges from 2 mm to 50 mm.

4. A cookware, comprising:
 a pot body; and
 the pot cover according to claim 1, wherein the groove is capable of inserting at any position of an opening edge of the pot body.

5. The cookware according to claim 4, wherein when the groove is inserted at the opening edge of the pot body, the cover body abuts against the pot body so that the cover body forms an acute angle with the horizontal plane.

6. The cookware according to claim 4, wherein when the groove is inserted at the opening edge of the pot body, a projection of a centroid of the pot cover on the horizontal plane is in the projection of the pot body on the horizontal plane.

7. The cookware according to claim 4, wherein the opening edge of the pot body is provided with an outer flange, and a wall of the pot body is connected with the outer flange through an arc-shaped connecting edge.

8. The cookware according to claim 7, wherein when the groove is inserted at the opening edge of the pot body, the arc-shaped connecting edge, the outer flange and an outer wall of the pot body are respectively in contact with an inner wall of the groove.

* * * * *